United States Patent
Schultz et al.

(10) Patent No.: US 12,010,024 B2
(45) Date of Patent: Jun. 11, 2024

(54) TRANSPARENT MIGRATION OF VIRTUAL NETWORK FUNCTIONS

(71) Applicant: Google LLC, Mountain View, CA (US)

(72) Inventors: David Schultz, Albany, CA (US); Shuang Guan, Mountain View, CA (US); Srinivas Krishnan, Sunnyvale, CA (US); Eran Gal, Shoham (IL); Doron Shaharabani, Mountain View, CA (US); Yossi Richter, Sunnyvale, CA (US); Md Ahsan Arefin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/304,907

(22) Filed: Jun. 28, 2021

(65) Prior Publication Data

US 2021/0328927 A1    Oct. 21, 2021

Related U.S. Application Data

(63) Continuation of application No. 16/219,929, filed on Dec. 13, 2018, now Pat. No. 11,070,475.

(51) Int. Cl.
| | |
|---|---|
| H04L 12/803 | (2013.01) |
| G06F 9/455 | (2018.01) |
| H04L 9/40 | (2022.01) |
| H04L 29/06 | (2006.01) |
| H04L 29/12 | (2006.01) |
| H04L 47/125 | (2022.01) |
| H04L 61/256 | (2022.01) |

(52) U.S. Cl.
CPC ........ *H04L 47/125* (2013.01); *G06F 9/45558* (2013.01); *H04L 61/256* (2013.01); *H04L 63/02* (2013.01); *G06F 2009/4557* (2013.01); *G06F 2009/45595* (2013.01)

(58) Field of Classification Search
CPC ..... H04L 47/125; H04L 63/02; H04L 61/256; G06F 9/45558; G06F 2009/4557; G06F 2009/45595
See application file for complete search history.

(56) References Cited

U.S. PATENT DOCUMENTS

| | | |
|---|---|---|
| 8,374,102 B2 | 2/2013 | Luft et al. |
| 9,552,219 B2 | 1/2017 | Zhang et al. |
| 9,635,114 B2 | 4/2017 | Eggert et al. |

(Continued)

FOREIGN PATENT DOCUMENTS

| | | |
|---|---|---|
| CN | 103491053 A | 1/2014 |
| CN | 106850459 A | 6/2017 |

(Continued)

*Primary Examiner* — Kostas J Katsikis
(74) *Attorney, Agent, or Firm* — Honigman LLP; Brett A. Krueger

(57) ABSTRACT

A method includes identifying a middlebox receiving network flow and communicating with one or more backend virtual machines. The method also includes receiving flow statistics corresponding to the network flow of the middlebox and determining whether the flow statistics satisfy an offload rule. The offload rule indicates when to migrate the network flow from the middlebox to an end host. When the flow statistics satisfy the offload rule, the method also includes migrating the network flow from the middlebox to the end host.

20 Claims, 9 Drawing Sheets

(56) References Cited

U.S. PATENT DOCUMENTS

| | | | |
|---|---|---|---|
| 10,409,649 B1 | 9/2019 | Young et al. | |
| 2009/0086651 A1 | 4/2009 | Luft et al. | |
| 2013/0227674 A1* | 8/2013 | Anderson | H04L 63/1441 |
| | | | 726/15 |
| 2014/0181267 A1* | 6/2014 | Wadkins | H04L 41/0893 |
| | | | 709/219 |
| 2015/0006730 A1 | 1/2015 | Helfman et al. | |
| 2015/0180769 A1 | 6/2015 | Wang et al. | |
| 2015/0215406 A1 | 7/2015 | Eggert et al. | |
| 2016/0043951 A1 | 2/2016 | Srinivas et al. | |
| 2016/0191400 A1* | 6/2016 | Sreeramoju | H04L 47/34 |
| | | | 370/474 |
| 2016/0274951 A1* | 9/2016 | Koizumi | H04L 47/125 |
| 2016/0359628 A1 | 12/2016 | Singh et al. | |
| 2017/0070912 A1 | 3/2017 | Kozat et al. | |
| 2017/0078198 A1 | 3/2017 | Nellikar et al. | |
| 2017/0180249 A1 | 6/2017 | Shen et al. | |
| 2017/0180250 A1 | 6/2017 | Shen et al. | |
| 2017/0180382 A1 | 6/2017 | Taylor et al. | |
| 2018/0109606 A1 | 4/2018 | Alpert et al. | |
| 2018/0373961 A1* | 12/2018 | Wang | H04L 41/145 |
| 2019/0238633 A1* | 8/2019 | Rao | H04L 41/0895 |

FOREIGN PATENT DOCUMENTS

| | | | |
|---|---|---|---|
| EP | 3229405 A1 | 10/2017 | |
| GB | 2556446 A | 5/2018 | |
| WO | 2017113273 A1 | 7/2017 | |
| WO | 2018071188 A1 | 4/2018 | |

* cited by examiner

TRANSPARENT MIGRATION OF VIRTUAL NETWORK FUNCTIONS

CROSS REFERENCE TO RELATED APPLICATIONS

This U.S. patent application is a continuation of, and claims priority under 35 U.S.C. § 120 from, U.S. patent application Ser. No. 16/219,929, filed on Dec. 13, 2018. The disclosure of this prior application is considered part of the disclosure of this application and is hereby incorporated by reference in its entirety.

TECHNICAL FIELD

This disclosure relates to transparent migration of virtual network functions.

BACKGROUND

Computing devices in a software-defined network may not have physical connections, but may be virtually linked to one another (i.e., a virtual network). Software-defined networking allows networks to be managed through abstraction of lower level functionality. A control plane in a virtual network usually makes decisions about how to route data packets of network traffic from a source virtual machine in the network to a destination virtual machine. A data plane forwards network traffic to selected destinations. In a software-defined network, methods of network virtualization decouple the control plane of a network from the data plane. Therefore, virtual networks often bear little resemblance to the underlying physical network, which means that traditional techniques for making networks scale do not work for virtual networks. As a result, scaling to form large virtual networks can be problematic using conventional network functionality.

SUMMARY

One aspect of the disclosure provides a method for transparent migration of virtual network functions. The method includes identifying, by data processing hardware, a middlebox receiving network flow and communicating with one or more backend virtual machines. The method also includes receiving, at the data processing hardware, flow statistics corresponding to the network flow of the middlebox. The method further includes determining, by the data processing hardware, whether the flow statistics satisfy an offload rule, the offload rule indicating when to migrate network flow from the middlebox to an end host. When the flow statistics satisfy the offload rule, the method includes migrating, by the data processing hardware, the network flow from the middlebox to the end host.

Implementations of the disclosure may include one or more of the following optional features. In some implementations, the middlebox includes at least one of a network address translator (NAT), a load balancer, or a firewall. In these implementations, the middlebox may be associated with a single network device configured to perform network routing. The middlebox may include a load balancer configured to balance network load between network connections and the one or more backend virtual machines. Here, the load balancer includes a connection table mapping each network connection to a corresponding one of the one or more backend virtual machines.

In some examples, migrating the network flow from the middlebox to the end host includes initiating an end-host connection table at the end host. Additionally or alternatively, migrating the network flow from the middlebox to the end host may include initiating an end-host connection table at the end host, identifying a network connection request received at the end host, determining that the network connection request corresponds to a new network connection, updating the end-host connection table with the new network connection, and controlling a network flow for the new network connection at the end host.

In some configurations, migrating the network flow from the middlebox to the end host includes initiating an end-host connection table at the end host, identifying a network connection request received at the end host, determining that the network connection request corresponds to an existing network connection not present in the end-host connection table, and communicating a network flow for the existing network connection from the end host to the middlebox. Here, migrating the network flow from the middlebox may also include transferring a middlebox connection table from the middlebox to the end host. When the middlebox connection table is transferred from the middlebox to the end host, the method may include ceasing communication between the end host and the middlebox. After migrating the network flow from the middlebox to the end host, the method may also include determining, by the data processing hardware, a reduction in the network flow to the end host during a period of time and migrating, by the data processing hardware, the network flow from the end host to the middlebox.

In some implementations, the middlebox is configured to communicate with the one or more backend virtual machines based on consistent hashing. In some configurations, migrating the network flow from the middlebox to the end host may also include identifying that a first health characteristic of each backend virtual machine of the one or more backend virtual machines communicating with the middlebox indicates a healthy state and determining that a second health characteristic corresponding to the end host matches the healthy state of the first health characteristic. The end host may include one of the one or more backend virtual machines or an end point within a physical network layer.

Another aspect of the disclosure provides a system for transparent migration of virtual network functions. The system includes data processing hardware and memory hardware in communication with the data processing hardware. The memory hardware stores instructions that when executed on the data processing hardware cause the data processing hardware to perform operations. The operations include identifying a middlebox receiving network flow and communicating with one or more backend virtual machines and receiving flow statistics corresponding to the network flow of the middlebox. The operations also include determining whether the flow statistics satisfy an offload rule. The offload rule indicates when to migrate network flow from the middlebox to an end host. When the flow statistics satisfy the offload rule, the operations further include migrating the network flow from the middlebox to the end host.

This aspect may include one or more of the following optional features. In some examples, the middlebox includes at least one of a network address translator (NAT), a load balancer, or a firewall. In these examples, the middlebox may be associated with a single network device configured to perform network routing. Optionally, the middlebox includes a load balancer configured to balance network load between network connections and the one or more backend virtual machines. Here, the load balancer includes a connection table mapping each network connection to a corresponding one of the one or more backend virtual machines. Migrating the network flow from the middlebox to the end host may include initiating an end-host connection table at the end host. Additionally or alternatively, migrating the network flow from the middlebox to the end host may include initiating an end-host connection table at the end host, identifying a network connection request received at the end host, determining that the network connection request corresponds to a new network connection, updating the end-host connection table with the new network connection, and controlling a network flow for the new network connection at the end host.

In some configurations, the network flow from the middlebox to the end host includes initiating an end-host connection table at the end host, identifying a network connection request received at the end host, determining that the network connection request corresponds to an existing network connection not present in the end-host connection table, and communicating a network flow for the existing network connection from the end host to the middlebox. In this configuration, migrating the network flow from the middlebox may also include transferring a middlebox connection table from the middlebox to the end host. When the middlebox connection table is transferred from the middlebox to the end host, the operations may include ceasing communication between the end host and the middlebox. In other configurations, after migrating the network flow from the middlebox to the end host, the operations include determining a reduction in the network flow to the end host during a period of time and migrating the network flow from the end host to the middlebox.

In some implementations, the middlebox is configured to communicate with the one or more backend virtual machines based on consistent hashing. In some configurations, migrating the network flow from the middlebox to the end host may include identifying that a first health characteristic of each backend virtual machine of the one or more backend virtual machines communicating with the middlebox indicates a healthy state and determining that a second health characteristic corresponding to the end host matches the healthy state of the first health characteristic. The end host may include one of the one or more backend virtual machines or an end point within a physical network layer.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
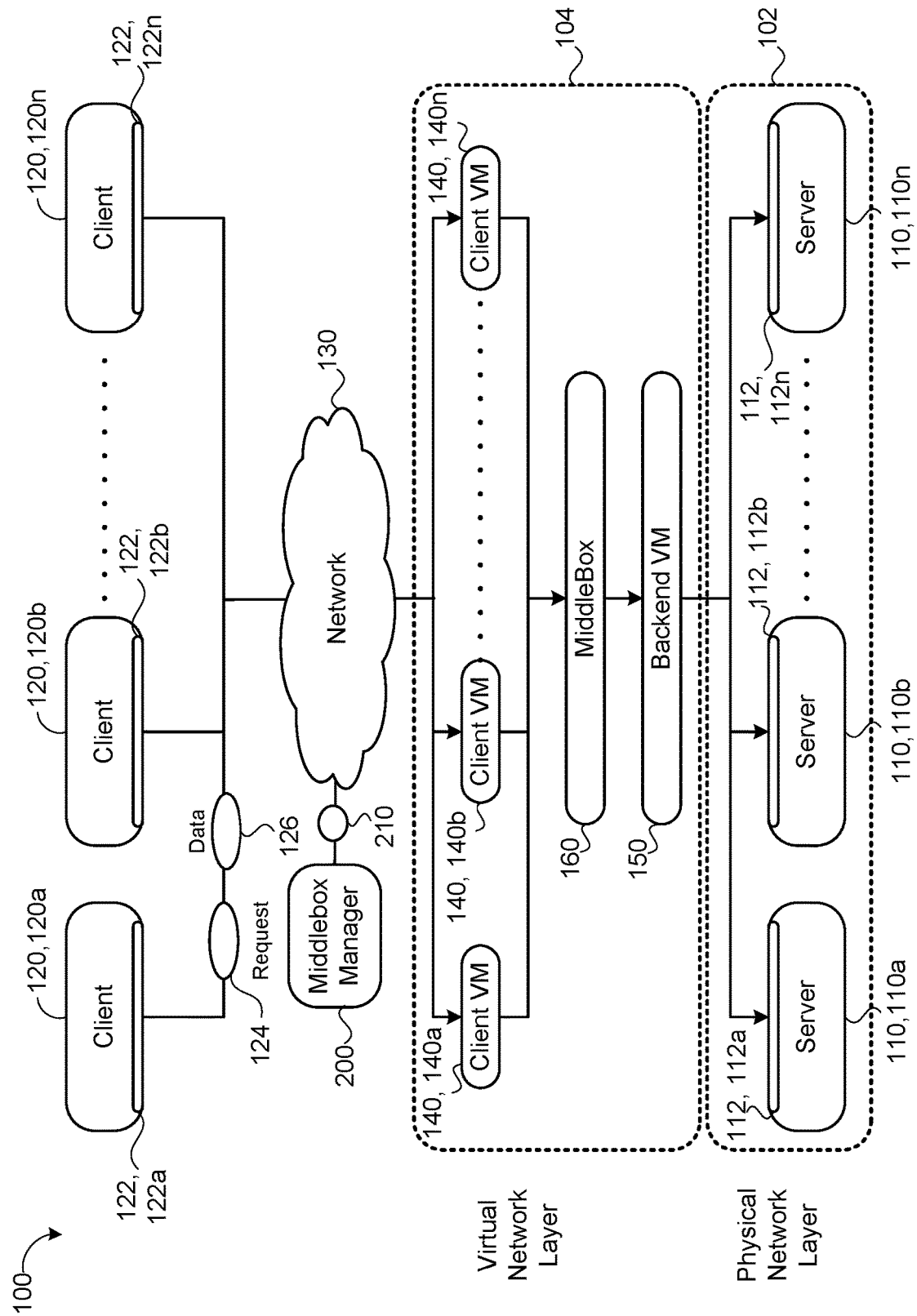
FIGS. 1A-1C are schematic views of example virtual networking environments.
Figure 1B:
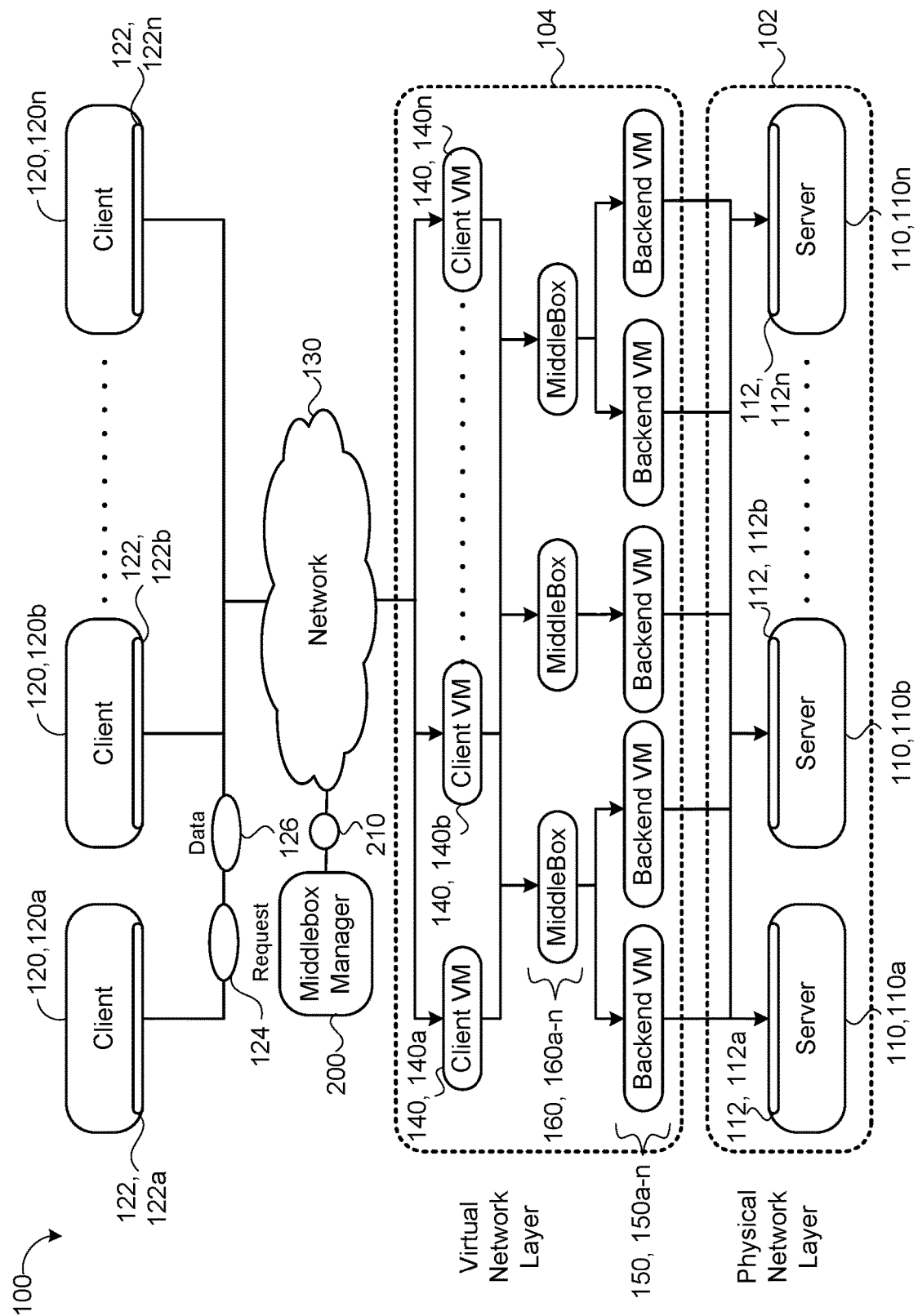
Figure 1C:
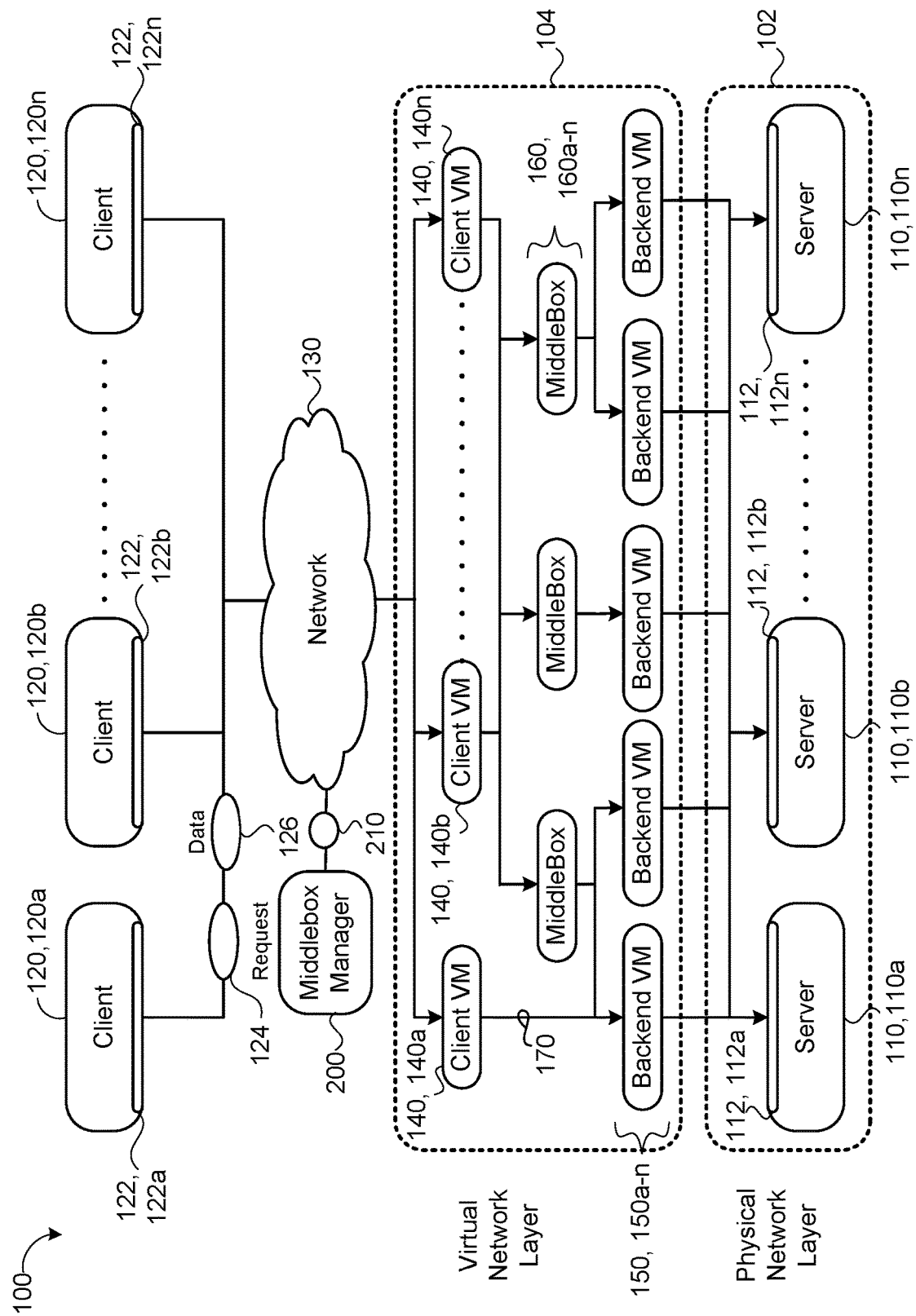

Referring to FIGS. 1A-1C, in some implementations, a networking environment 100 includes a physical network layer 102 and a virtual network layer 104. In some examples, the physical network layer 102 is a distributed system (e.g., a remote network such as a cloud environment) having loosely coupled computing resources 110, 110a-n. These computing resources 110 may include data processing hardware (e.g., one or more central processing units (CPUs)) and/or memory hardware (e.g., flash memory, random access memory (RAM), phase change memory (PCM), and/or discs) accessible to one or more clients 120, 120a-n. For example, the computing resources 110 are shown as a plurality of servers. The clients 120 may communicate with computing resources 110 hosted on the physical network layer 102 through a network 130. For instance, the clients 120 and the servers represent a collection of machines (e.g., hosts) forming end points of a physical network.

There may be many different types of networks 130 ranging from private networks and enterprise networks to public networks. Some more specific examples of networks include personal area networks (PAN), local area networks (LAN), wireless local area networks (WLAN), wide area networks (WAN), storage/system area networks (SAN), passive optical networks (PON), enterprise private networks (EPN), virtual private networks (VPN), etc. In some configurations, clients 120 and end hosts (i.e., hosts of the computing resources 110) may access (i.e., connect to) the network 130 via hardware such as network interface controllers (NICs) (also known as a network interface card, network adapter, or LAN adapter) or, in the case of an optical network, synchronous transport modules (STMs). For example, FIGS. 1A-1C depict each client 120 with at least one NIC 122, 122a-n and each server with at least one NIC 112, 112a-n.

A virtual network layer, such as the virtual network layer 104, may be overlain on the physical network layer 102 to form a virtual network (also known as an overlay network) with its own internet protocol (IP) address space. The virtual network layer 104 enables the network 130 to be managed (e.g., by network administrators), designed, and/or deployed in a manner that may decouple network functionality from hardware appliances (e.g., proprietary hardware appliances). In other words, the virtual network layer 104 permits virtual network functionality (also referred to as network function virtualization) such that network services may operate by software to permit adaptability and scalability over a traditional networks with dedicated hardware. For instance, software-defined networking (SDN) of virtual networks removes the control plane from network hardware and implements the control plane instead in software. In some implementations, the virtual network layer 104 of the network 130 performs some network functionality virtually via software while performing other network functions with dedicated hardware in a hybrid virtualization approach. Virtual and/or hybrid approaches may allow flexibility and/or optimization for network providers or network administrators with respect to network space, power, size, scalability, deployment time, and/or repair and maintenance. For example, a virtual network layer 104 is dynamically configured to permit underlying changes to the physical network layer 102 without disrupting network services.

The virtual network layer 104 may be configured to perform a variety of network functions and/or mirror traditional network functions of physical networks. Some examples of these network functions include routing, network address translation (NATs), load balancing (LBs), security (e.g., firewalls and intrusion detection/prevention systems), protocol converting, wide area network optimization, proxies, caching, etc. In other words, virtual network functionality may be applicable to any data plane processing or control plane function within the network 130.

With continued reference to FIGS. 1A-1C, the virtual network layer 104 includes virtual network end points. Here, the virtual network end points are depicted as virtual machines (VMs), such as client virtual machines (client VMs) 140, 140a-n and backend virtual machines (backend VMs) 150, 150a-n. A virtual machine (VM) generally refers to an emulation or image of one or more host computer systems that enable a user to experience functionality of the host computer system without an ability to disturb an underlying operating system of a corresponding host computer system. VMs may be created to perform specialized tasks within one or more host environments. In some examples, the virtual network layer 104 allows multiple VMs to exist within a host computer system simultaneously. In order to allow multiple VMs to operate at once, the VMs are often sandboxed from the critical operating system resources of the host computer system. VMs may be advantageous to virtual network layers 104 because they may be designed to map to (e.g., access) one or more computing resources 110 of the physical network layer 102 via a backend VM 150. For example, one or more client VMs 140 maps to one or more backend VMs 150 where the backend VM 150 is a VM associated with computing resources 110 of a physical network layer 102 (e.g., a distributed system). By mapping to particular computing resources 110, the client VM 140, in conjunction with the backend VM 150, may be designed for particular network services (e.g., network applications). In some configurations, backend VMs 150 operate as host-based VMs where data may be contained on servers of the physical network layer 102 and accessible by or allocated to a variety of remote clients 120. For instance, the virtual network layer 104 with VMs permits a centrally managed networked structure. Although network virtualization is generally described with respect to VMs, network virtualization (e.g., with a virtual network layer 104) can be generalized to connect other types of network end points, including virtual private networks (VPNs), bare metal servers, proxies, etc. For example, the networking environment 100 supports VPN gateways as a client which forwards requests from a customer's premises. Accordingly, in some examples, a VM is more generally a network end point to accommodate for other types of network connections.

In some implementations, in order to perform network functions, the virtual network layer 104 of the networking environment 100 includes at least one middlebox 160. A middlebox 160 generally refers to any intermediary device that performs functions other than normal, standard functions of an internet protocol (IP) router on a datagram path between a source host (e.g., a client via a client VM 140) and a destination host (e.g., servers of the physical network layer 102 via a backend VM 150). In other words, the middlebox 160 is usually responsible for network functionality other than packet routing (e.g., network address translation (NATs), network address port translation (NAPT), load balancing (LBs), firewalls, intrusion detection/prevention systems, protocol converting, proxies). Although a middlebox 160 is typically responsible for network functionality other than routing, the middlebox 160 may be part of a device that also handles routing such that a networking environment 100 includes a single device supporting both routing and middlebox functions.

Within the networking environment 100, the middlebox 160 receives network flow from one or more clients 120 to perform network functions. Network connections with middlebox(es) 160 may be established based on connection requests 124 from a client 120. In other words, connections may be negotiated between a client 120 and a backend such that the middlebox 160 sits in the middle, processing and potentially modifying packets belonging to a connection. Once connections have been established with the middlebox 160 (e.g., forming a virtual connection between the client VM 140 and the backend VM 150), the middlebox 160 receives network traffic (e.g., data 126) based on the configured network functionality of the middlebox 160.

In some examples, the middlebox 160 performs NAT or NAPT on packets between the client 120 and the backend (e.g., backend VM). In the case of NAPT, the middlebox 160 tracks each connection and port mappings assigned to each connection. In other examples, the middlebox 160 is a layer-4 load balancer middlebox that forwards packets between the client 120 and the backend while also potentially tracking connections to ensure that future packets belonging to a connection continue to connect to the same backend. Alternatively, the middlebox 160 may be a layer-7 load balancer where a client 120 establishes a transmission control protocol (TCP) with the middlebox 160 and the middlebox 160 establishes a separate connection with a backend (i.e., on behalf of the client 120). For a layer-7 load balancer, the transport protocol state (e.g., TCP sequence numbers and window sizes) would transfer from the middlebox 160 to a respective end host(s).

In some implementations, an overlay network, such as a virtual network layer 104, is not required to perform middlebox functions. For example, in a network, such as a physical Ethernet network, software running on an end host could direct a connection to a middlebox 160 by setting the destination medial access control (MAC) address to a MAC address corresponding to the middlebox 160. Here, to offload the connection, the host would set the MAC address to the address of the destination (or the address of an appropriate gateway to reach the destination). In other words, the middlebox 160 may communicate with physical machines instead of VMs. For instance, in load balancing, clients 120 and servers need not be VMs on a virtual network layer 104, but rather connections between physical machines.

Middlebox(es) 160 may differ from routers in the respect that middlebox(es) 160 often perform stateful network functions. More specifically, stateful network functions refer to network functions that track an operating state and/or characteristic of network connections associated with the network function. For example, the middlebox 160 tracks connections such that the middlebox 160 is connection-aware, inspects packet context (e.g., periodically inspects payloads), and/or associates new connections with existing connections. By performing stateful functions, middlebox(es) 160 include a greater degree of data granularity to identify and/or recall connection events or connection data associated with previous sessions of a client 120 or a VM. These stateful functions may offer the virtual network layer 104 security and performance benefits that may help stabilize network services.

FIG. 1B illustrates that, in some implementations, the virtual network layer 104 includes more than one middlebox 160 associated with one or more backend VM 150. The virtual network layer 104 may be configured with clusters where network flow associated with a client VM 140 is allocated to at least one middlebox 160 dedicated to a particular set of backend VMs 150 (e.g., middlebox 160a associated with backend VM 150a-b). In these examples, a cluster may also associate a particular middlebox 160 and set of a backend VMs 150 with particular computing resources 110 of the physical network layer 102. For example, a first middlebox 160a is associated with two backend VMs 150a-b that utilize computing resources 110a from the physical network layer 102. Additionally or alternatively, cluster configurations may also support virtual networks with multi-tenancy where multiple clients 120 operate VMs in different virtual networks sharing computing resources 110 of the physical network layer 102.

As depicted by FIGS. 1A and 1B, network functionality of the virtual network layer 104 is performed by middlebox(es) 160. As a number of clients and/or hosts increases in size, the middlebox 160 proportionally receives an increase in network flow and connections that demands greater programming resources to program and/or to manage activity at a middlebox 160, particularly in functions performed by a middlebox 160 with stateful tracking (e.g., connection tables). In these instances, the middlebox 160, as an intermediary device, may add latency, a bottleneck, and an additional hop for the network functions between a client VM 140 and a backend VM 150. Therefore, although virtual network functions may address scaling challenges in a control plane for a network, virtual network functions still suffer scaling problems in the data plane.

Referring to FIG. 1C, in some examples, the virtual network layer 104 is configured to offload one or more intermediary network connections through a middlebox 160 to direct network connections between client VMs 140 and backend VMs 150. For example, FIG. 1C depicts a previous intermediary network connection within the virtual network layer 104 as a direct network connection 170 between a first client VM 140a and a first backend VM 150a. Although this is simply one illustration, a middlebox manager 200 (shown in FIGS. 1A-1C) may dynamically manage offloading for middlebox functions based on offloading rules. Due to the dynamic and fluid nature possible with a virtual network layer 104, the middlebox manager 200 may also aim to manage scalability of the virtual network layer 104 to resolve or to minimize scalability issues for the control plane and/or the data plane within a virtual network (e.g., scalable issues with stateful network functions). By offloading or migrating network flow from a middlebox 160 to an end host (e.g., a backend VM 150), a virtual network layer 104 may strategically balance network flow associated with network functions to improve a client networking experience, especially within a larger or growing network. An end host may refer to an end point within the virtual network layer 104, such as a backend VM 150, or, in some configurations, an end point within the physical network layer 102.

Although middlebox management may be described hereinafter with respect to the network functionality of load balancing, the middlebox management techniques are equally applicable to other middlebox functions (e.g., NATs, firewalls, etc.). Typically, a client 120 may use a load balance service with servers to balance network loads. Traditionally, one approach to load balancing employs a dedicated middlebox appliance that includes a CPU, local storage, and/or means for packet processing (e.g., an application specific integrated circuit (ASIC)). With a dedicated appliance, when a client 120 initiates a connection (e.g., by a connection request 124), the network 130 sends the connection to the dedicated middlebox appliance and the middlebox appliance proxies the traffic to the backend (e.g., a backend VM 150). As a dedicated middlebox appliance, the middlebox appliance is physical hardware in the network. Unfortunately, as a physical piece of hardware, a dedicated middlebox appliance suffers scaling challenges since scaling requires proportionally scaling the physical hardware to accommodate for size changes. Furthermore, a dedicated appliance may also result in a large degree of overprovisioning since dedicated hardware appliance must be provisioned to meet peak traffic demands within the network 130.

Another traditional approach to load balancing is client-side load balancing. Client-side networking functionality is a distributed approach where middlebox functionality is implemented on end hosts, eliminating middleboxes. One such example is where the client-side networking functionality is built into an operation system (OS) kernel or virtual switch (e.g., an Open vSwitch). For example, in client-side load balancing, a client host uses software to decide independently which backends to use. This approach shifts all of the load balancing functions to the end hosts where an end host has a table of all of the backends. Unlike, the dedicated hardware approach, client-side functionality (i.e. a distributed approach) may accommodate for data plane scaling, but suffers from control plane scaling challenges. This is often because, in a distributed approach, a client must be distributed information regarding all services, backends, health characteristics, etc. to allow a clients-side functionality decision.

Unlike these traditional approaches, FIGS. 2A-2D illustrate a hybrid approach with the middlebox manager 200. Here, the middlebox manager 200 is configured to receive metrics 202 such as flow statistics from a middlebox 160 receiving network flow to one or more backend VMs 150 and migrate (i.e. offload) network flow from the middlebox 160 based on the metrics 202. In some examples, measurement and/or analysis of the metrics 202 occurs at other network components within the networking environment 100 (e.g., the middlebox 160, end host(s), top-of-rack switches, etc.) and the middlebox manager 200 receives instructions from these other network components to offload a specific network flow. The middlebox manager 200 may be a network administrator or an element of a control plane associated with the virtual network layer 104.

Figure 2A:
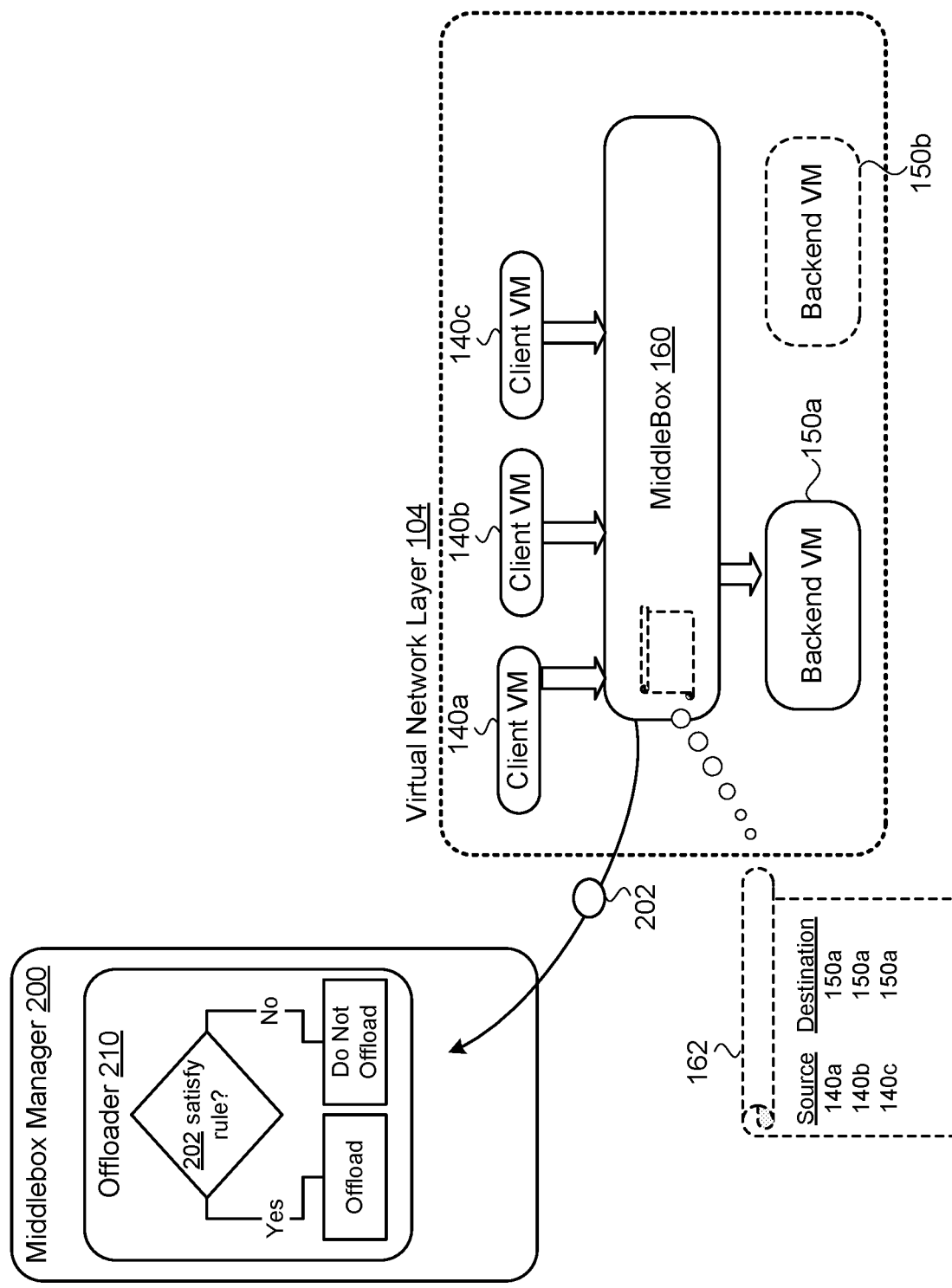
FIGS. 2A-D are schematic views of example middlebox managers that migrate virtual network functions.

In some implementations, to determine whether to migrate network flow from a middlebox 160, the middlebox manager 200 includes an offloader 210 that is configured with at least one offload rule. The offloader 210 decides whether to offload network flows through the middlebox 160 that meet the criteria of a given offload rule. As shown in FIG. 2A, the offloader 210 determines whether to offload a particular connection or network flow associated with the particular connection based on whether at least one metric 202 satisfies at least one offload rule. For example, an offload rule may offload any flow that exceeds a particular speed or bandwidth (e.g., 20 kbps), whereby the metric 202 in this example corresponds to speed/bandwidth of the network flow. Offload rules may also be compounded or constrained. For instance, although a first offload rule may offload flow that exceeds 20 kbps, a second offload rule may constrain the number of flows that have been offloaded by the first rule (e.g., the middlebox manager 200 may offload no greater than 20 flows exceeding 20 kbps). An additional offload rule may be to offload a high-bandwidth flow when the aggregate bandwidth going through a particular middlebox 160 that the high-bandwidth flow is using exceeds a configurable bandwidth threshold for the middlebox 160. In other examples, the offloader 210 offloads all flows within a subnet or within a certain physical radius. The offloader 210 may determine an offload rule dynamically based on factors such as: the aggregate bandwidth currently traveling through a middlebox 160, the number of flows already offloaded to a given host, the total number of offloaded flows (e.g., within the control plane or virtual network layer 104), and other flow statistics. Additionally or alternatively, an offload rule may include a threshold that automatically adjusts based on a load of the middlebox 160 or a SDN network controller.

Figure 2B:
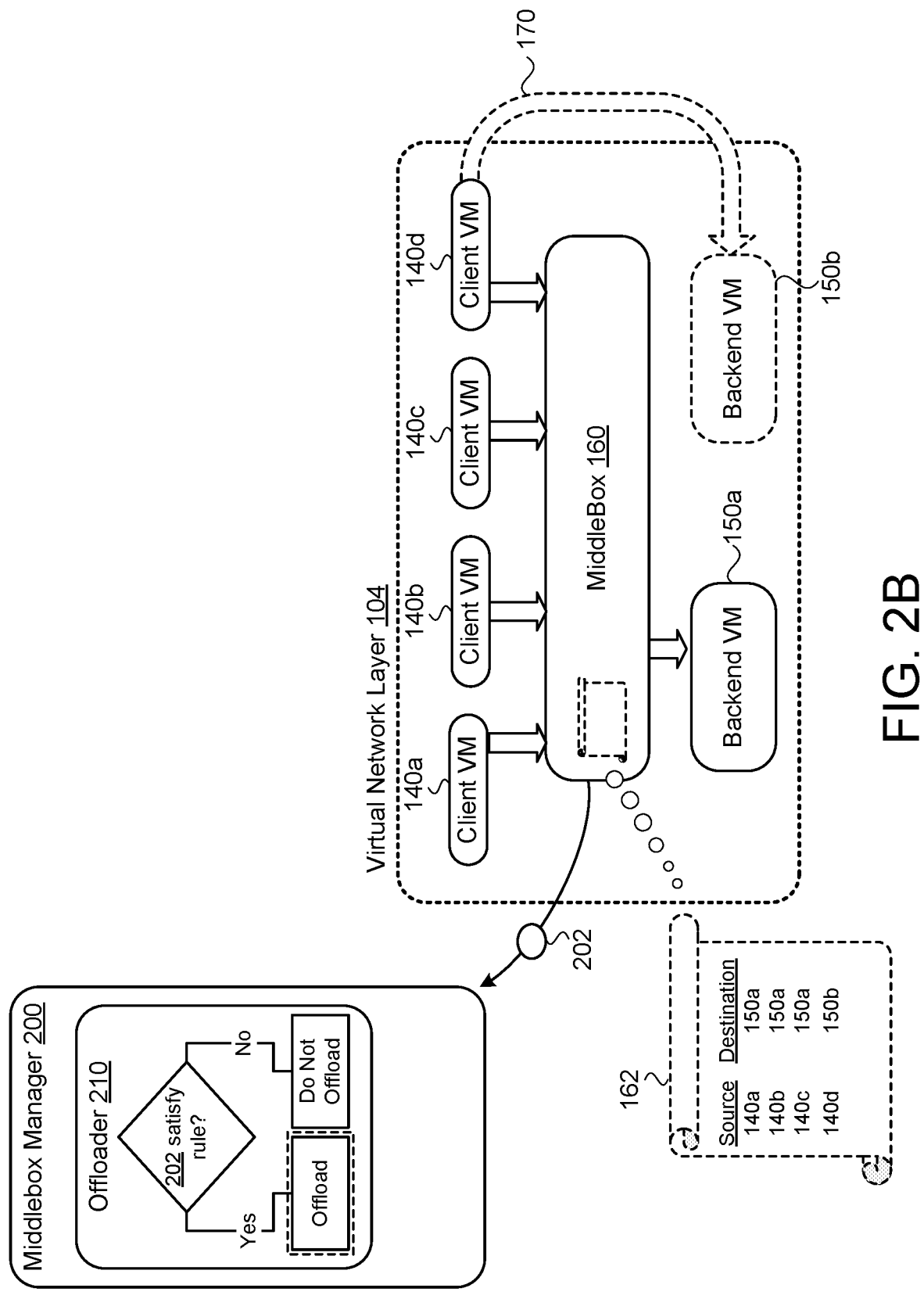

Referring to FIG. 2B, the virtual network layer 104 includes four client VMs 140a-d supported by a middlebox 160 and two backend VMs 150a-b. Here, the offloader 210 decides (e.g., shown by the dotted box around "offload") to offload the network flow or connection associated with the fourth client VM 140d from the middlebox 160 with the direct network connection 170 (shown by the dotted arrow) to the second backend VM 150b. FIG. 2B depicts the second backend VM 150b with a dotted line to indicate that the second backend VM 150b may be new to the virtual network layer 104 (e.g., for scalability of resources) or preexisting and now connected to receive network flow from the fourth client VM 140d.

In some examples, the middlebox manager 200 is configured to identify outlier types (uncommon types) of network flow based on flow statistics from the metrics 202. The middlebox manager 200 may then identify the connections associated with these outliers to be candidates to migrate (e.g., directly connect) to an end host. In some examples, the middlebox manager 200 is configured to first migrate outlier candidates before migrating network flow based on at least one offload rule associated with the offloader 210.

Figure 2C:
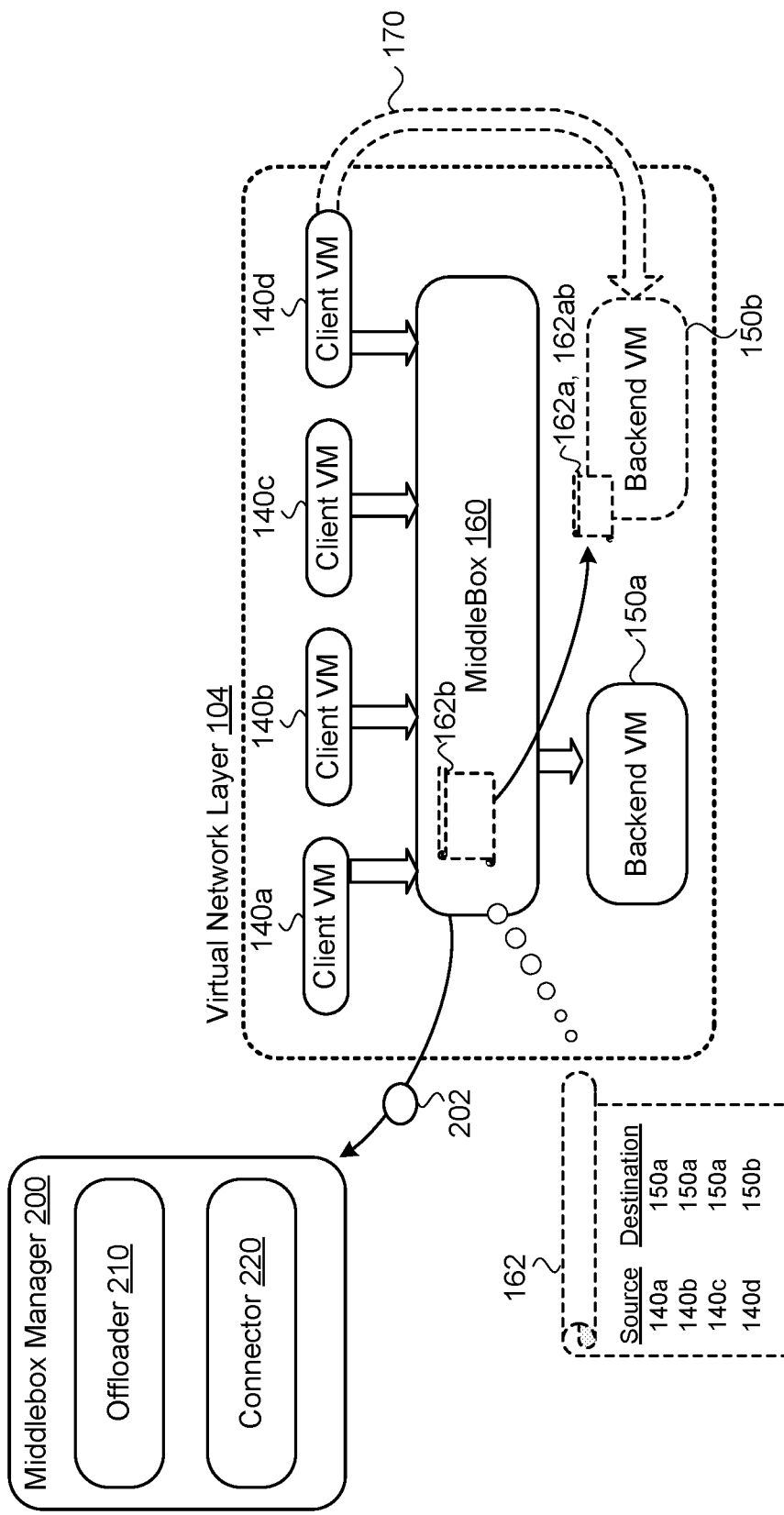

In some implementations, a middlebox 160 of a networking environment 100 includes a stickiness requirement. A stickiness requirement often refers to maintaining existing connections such that a connection to a middlebox 160 does not need to be reestablished or initialized for each interaction with a client 120 (e.g., each session). In order to track connections for the middlebox 160, the middlebox 160 may include a record 162 of connections. The record 162 may be a table indicating preexisting source and destination connections (e.g., as shown by FIGS. 2A-2C). An illustration of the concept of stickiness would be if FIG. 2A included three client VMs 140a-c and then transitioned to four client VMs 140a-d as shown by FIG. 2B. In this transition to maintain stickiness, when the middlebox 160 receives a new connection request or network flow from the fourth client VM 140d, the middlebox manager 200 is configured to map the new fourth client VM 140d to a corresponding backend VM 150 that does not disturb connections. For example, instead of offloading the existing network flow of the first, second, or third client VM 140a-c from the first backend VM 150a to the second backend VM 150b, the middlebox manager 200 maintains these existing connections and forms a direct connection between the fourth client VM 150d and the second backend VM 150b. In this respect, in some implementations, new backend VMs added to the virtual network layer 104 may only be used for new connections to avoid disrupting existing connections.

In some configurations, such as FIG. 2C, the middlebox manager 200 maintains stickiness by including a connector 220. Here, the connector 220 may maintain stickiness by using techniques such as consistent hashing for stateless middlebox network functions (e.g., load balancing) and/or connection tracking for stateful middlebox network functions. With the technique of consistent hashing, the connector 220 attempts to minimize disruptions to connections in a stateless manner. As an example, when N backend VMs 150 transition to N+1 backend VMs 150, the number of connections that get reassigned equals 1/N. In other words, consistent hashing does not prevent disruptions to existing connections, but rather minimizes the number of reassigned backend connections.

In some examples, the connector 220 uses the technique of connection tracking. With connection tracking, a middlebox 160 (e.g., a load balancer, NAT, or firewall) has a record 162 such as a connection table. The record 162 tracks past middlebox decisions and activity connecting various client VMs 140 to backend VMs 150 (or backend VMs 150 to computing resources 110 of the physical network layer 102). This approach may prevent disruptions to existing connections because when offloading or load balancing, an existing connection within the record 162 will not be reorganized by the middlebox manager 200.

Additionally or alternatively, when the connector 220 uses connection tracking, the middlebox manager 200 may decide to offload a preexisting connection. When this occurs, the connector 220 may ensure the record 162 transfers along with an offloaded connection. By transferring the record 162 (e.g., a connection table), an offloaded end host may continue tracking the state for a given network connection. For example, FIG. 2C depicts the record 162 transferring to the second backend VM 150b to account for the fourth client VM 140d offloading from the middlebox 160.

In some examples, when the middlebox manager 200 migrates a connection from the middlebox 160 to an end host, the connector 220 handles a transition phase for the offload process. As part of the transition phase, the connector 220 initiates a new record 162a (e.g., connection table) at the end host. Initially, this new record 162a at the end host is empty, but the connector 220 updates the new record 162a with new connections such that the end host controls any subsequent network flow from these new connections. During this transition phase, the middlebox 160 may handle network flow from existing connections that are not within the new record 162a at the end host. In other words, the middlebox 160 continues to control existing connections within an existing record 162b at middlebox 160 while the middlebox 160 communicates the existing record 162b to the end host. Once the transfer is complete, the transition process has formed a merged record 162ab of the new record 162a and the existing record 162b at the end host. At this point, the middlebox 160 ceases handling connections (i.e., ceases handling the existing connections from the existing record 162b).

Referring to FIGS. 2A-2C, the record 162 is shown as a simplified version of a table. In some implementations, the record 162 is a connection table that tracks individual TCP streams. The record 162 may include any combination of connection data such as source IP, destination IP, protocol (e.g., TCP, user datagram protocol (UDP), internet control message protocol (ICMP)), source transport port, destination transport port, or data regarding use (e.g., last-used time). When the record 162 is a table, the record 162 may include a column for each type of connection data. The record 162 may also include a state associated with each entry. In some examples, when a middlebox 160 for NAPT rewrites an IP and transport port to a different IP and transport port, the record 162 records these translations. In load balancing, for instance, the record 162 includes an identifier (ID) for a backend that was chosen/established for a given connection. A record 162 for a firewall may have nothing or include a sequence of numbers corresponding to its sequence number validation process.

In some examples, the networking environment 100 includes multiple middleboxes 160 supporting traffic with a combination of stateless and stateful network operations. For example, there may exist nested load balancing (multiple layers) in a networking environment 100 such that end hosts load balance to the middlebox and the middlebox/end host load balance to the backend. In situations like this, in order to offload or migrate network connections, the connector 220 may use either consistent hashing or connection tracking or some combination of both to optimize network functionality of the networking environment 100 across one or more layers of middleboxes 160.

Figure 2D:
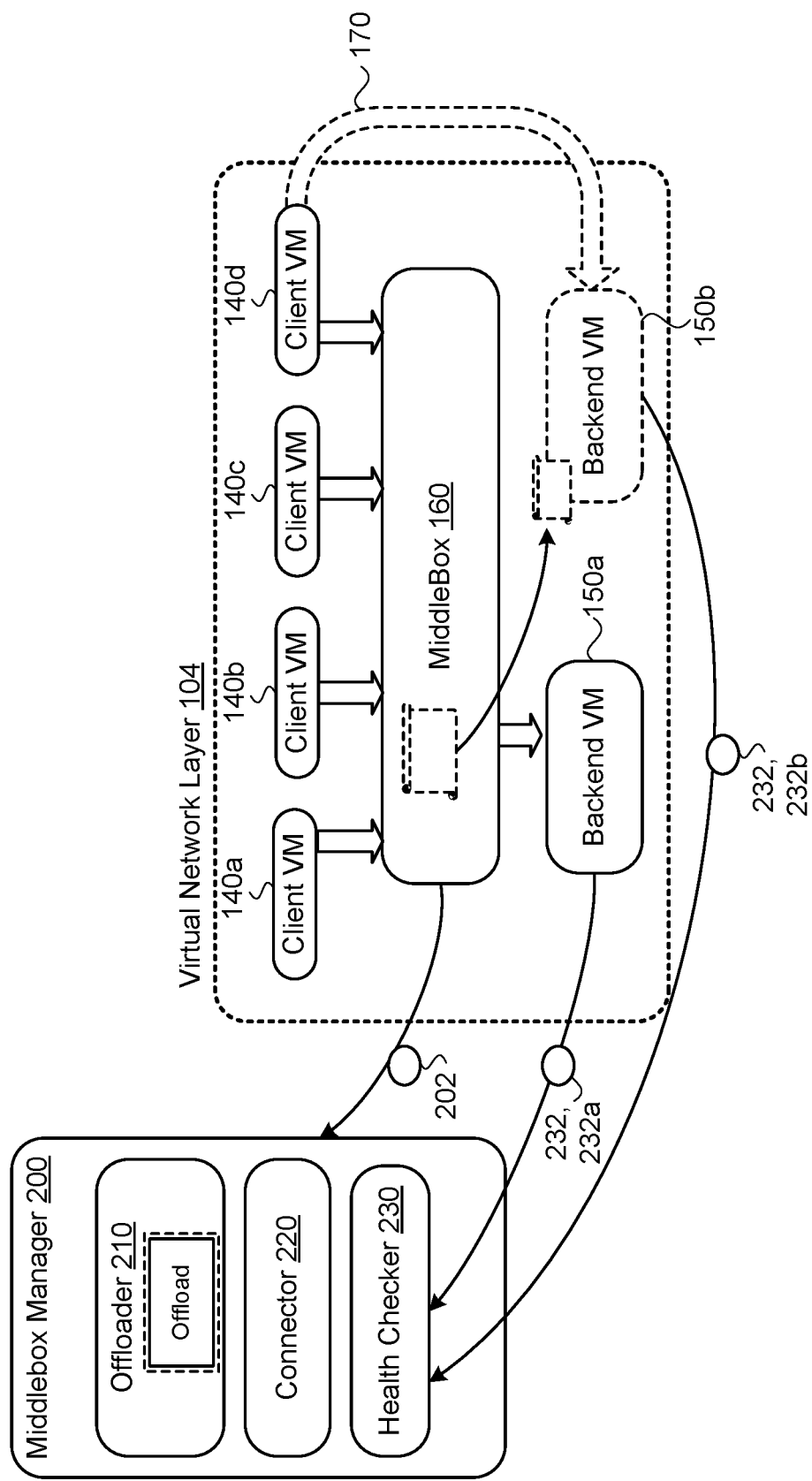

Referring to FIG. 2D, the middlebox manager 200 may further include a health checker 230. The health checker 230 is configured to check a health characteristic 232 of each backend VM 150. For example, FIG. 2D depicts the middlebox manager 200 receiving a first health characteristic 232*a* from the first backend VM 150*a* and a second health characteristic 232*b* from the second backend VM 150*b*. These health characteristics 232 may be communicated to the health checker 230 or identified by the health checker 230. In some examples, during middlebox functionality, the health checker 230 confirms that each backend VM 150 connected to a corresponding middlebox 160 indicates a healthy state. In these examples, when the middlebox manager 200 decides to migrate or to offload a network connection (e.g., shown in FIG. 2D as offloaded to the second backend VM 150*b*), the health checker 230 compares a first health characteristic 232*a* corresponding to the original middlebox connection to a second health characteristic 232*b* of the intended end host (e.g., the second backend VM 150*b*). When the health checker 230 determines that the second health characteristic 232*b* corresponding to the intended end host matches the healthy state of the first health characteristic 232*a*, the health checker 230 may permit the middlebox manager 200 to proceed to migrate the network flow. In some examples, when the health checker 230 determines that the second health characteristic 232*b* corresponding to the intended end host fails to match the healthy state of the first health characteristic 232*a* (i.e., corresponds to an unhealthy state), the health checker 230 prevents the middlebox manager 200 from performing the migration. In other words, the middlebox manager 200 may first decide to migrate a connection and an end host for the migrated connection and then ensure the chosen end host includes a health characteristic 232 that indicates a healthy state. Although FIG. 2D depicts the middlebox manager 220 with the health checker 230 and the connector 220, in some configurations, the health checker 230 may be employed by the middlebox manager 200 without the functionality of the connector 220 (e.g., consistent hashing and/or connection tracking).

The middlebox manager 200 may operate (i.e. offload by the offloader 210) at a particular granularity that has performance implications for the networking environment 100. When offloading occurs, packets matching certain criteria will have network functions applied by an end host (e.g., a backend VM 150) rather than by the middlebox 160. Granularity generally refers to a specificity of the criteria for the packets. In some examples, the middlebox manager 200 operates with 5-tuple granularity referring to source IP, destination IP, IP protocol, source transport port, and destination transport port (e.g., a single transmission control protocol (TCP) connection). Here, this 5-tuple granularity may be used for network functions, such as load balancing, firewall, or NAPT, in a relatively simple manner, but yet it requires a large number of flows to be offloaded.

In other examples, offloading with respect to load balancing occurs at a granularity of <sender, load-balanced IP>. In this model, when offloading occurs, the end host is programmed with a table (e.g., a record 162) of load-balanced backends for use by a client 120. The end host will then be able to independently select a backend for any future connections from that client 120. Here, these connections will not need to be offloaded separately.

In some implementations, firewalls offload at a granularity of <source IP range, destination IP range, protocol>. In this model, when offloading occurs, the end host is programmed with a firewall classifier indicating which ports are allowed by the firewall for the given source IP range, destination IP range, and protocol. For example, when two of thousands of firewall rules configured in the middlebox 160 indicate that TCP ports 22 and 80 should be allowed based on a destination IP prefix 10.0.0.0/8, implementation of this model would offload a firewall classifier indicating that tcp:22,80 should be allowed to the end host. The key scaling benefit here is that it is not necessary to program all of the firewall rules in all of the end hosts. In this model, a stateful firewall requires that the connection-tracking state transfers when offloading. Additionally or alternatively, a firewall may be offloaded at a granularity of <source IP range, destination IP range>, but this level of granularity results in a larger firewall classifier since the firewall classifier would need to convey protocol information.

When offloading NAPT functions, the middlebox manager 200 may offload all egress flows associated with a given sender. When offloading occurs, the SDN controller programs the end host with a set of IPs and ports that the end host may assign to future connections initiated by the sender. In some examples, when the end host exhausts all designated IPs and ports, future connections may revert to the middlebox 160 until the end host resolves the IPs and ports (e.g., receives another set of IPs and ports from the controller). In this model, when offloading occurs, any existing connection-tracking state must also be transferred from the middlebox 160 to the end host.

In some implementations, to control offloading, the middlebox 160 and/or middlebox manager 200 is programmable software or hardware (e.g., application specific integrated circuits (ASICs) or field programmable grid-array (FPGA)). Here, the software or hardware may be located either on an end host, adjacent to an end host (e.g., bump-in-the-wire topologies), or in a top-of-rack switch.

Figure 3:
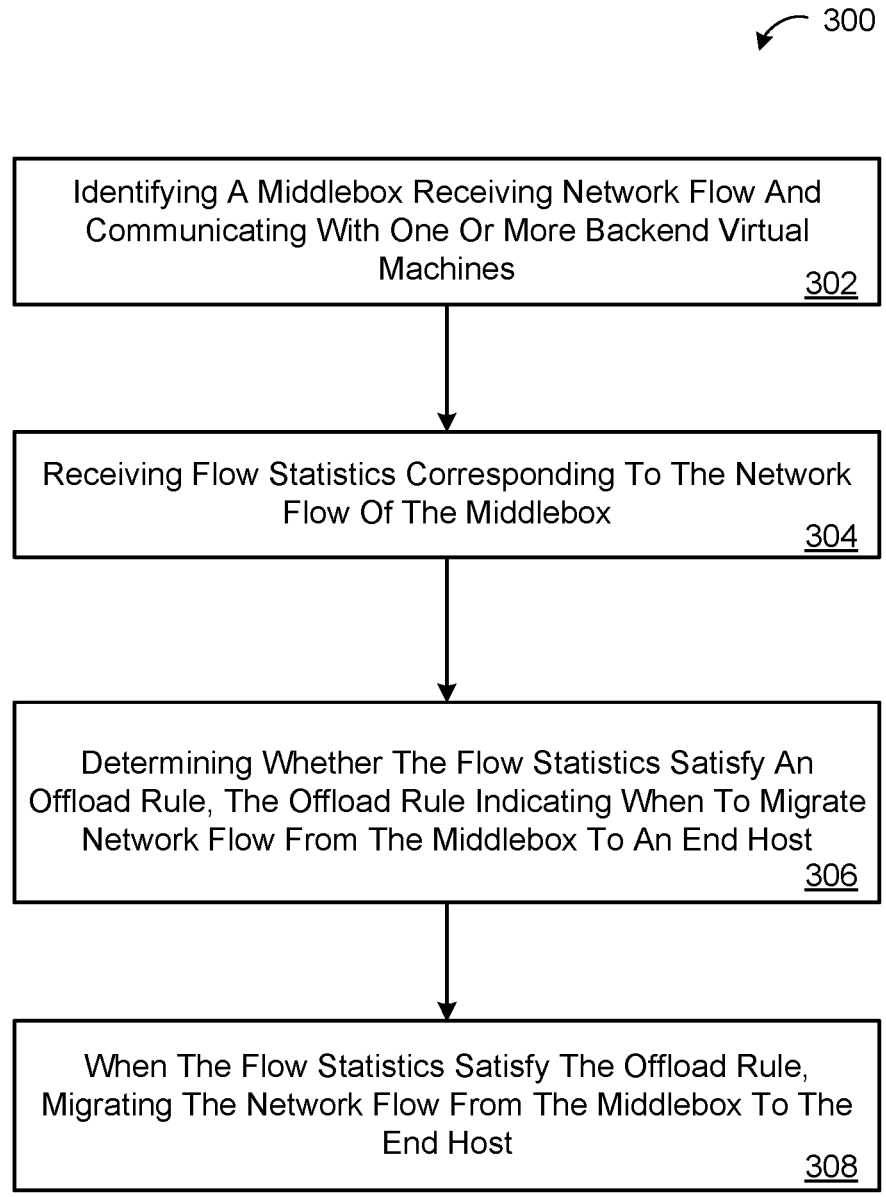
FIG. 3 is a flow diagram of an example arrangement of a method to migrate virtual network functions.

FIG. 3 is an example of a method 300 that migrates virtual network functions. The middlebox manager 200 may execute the method 300. Data processing hardware of the physical network layer 102 or other data processing hardware may execute the middlebox manager 200. At operation 302, the method 300 identifies a middlebox 160 receiving network flow and communicating with one or more backend VM 150. At operation 304, the method 300 receives flow statistics (also referred to as metrics 202) corresponding to the network flow of the middlebox 160. At operation 306, the method 300 determines whether the flow statistic satisfies an offload rule. Here, the offload rule indicates when to migrate network flow from the middlebox 160 to an end host. At operation 308, when the flow statistics satisfy the offload rule, the method 300 migrates the network flow from the middlebox 160 to the end host.

Figure 4:
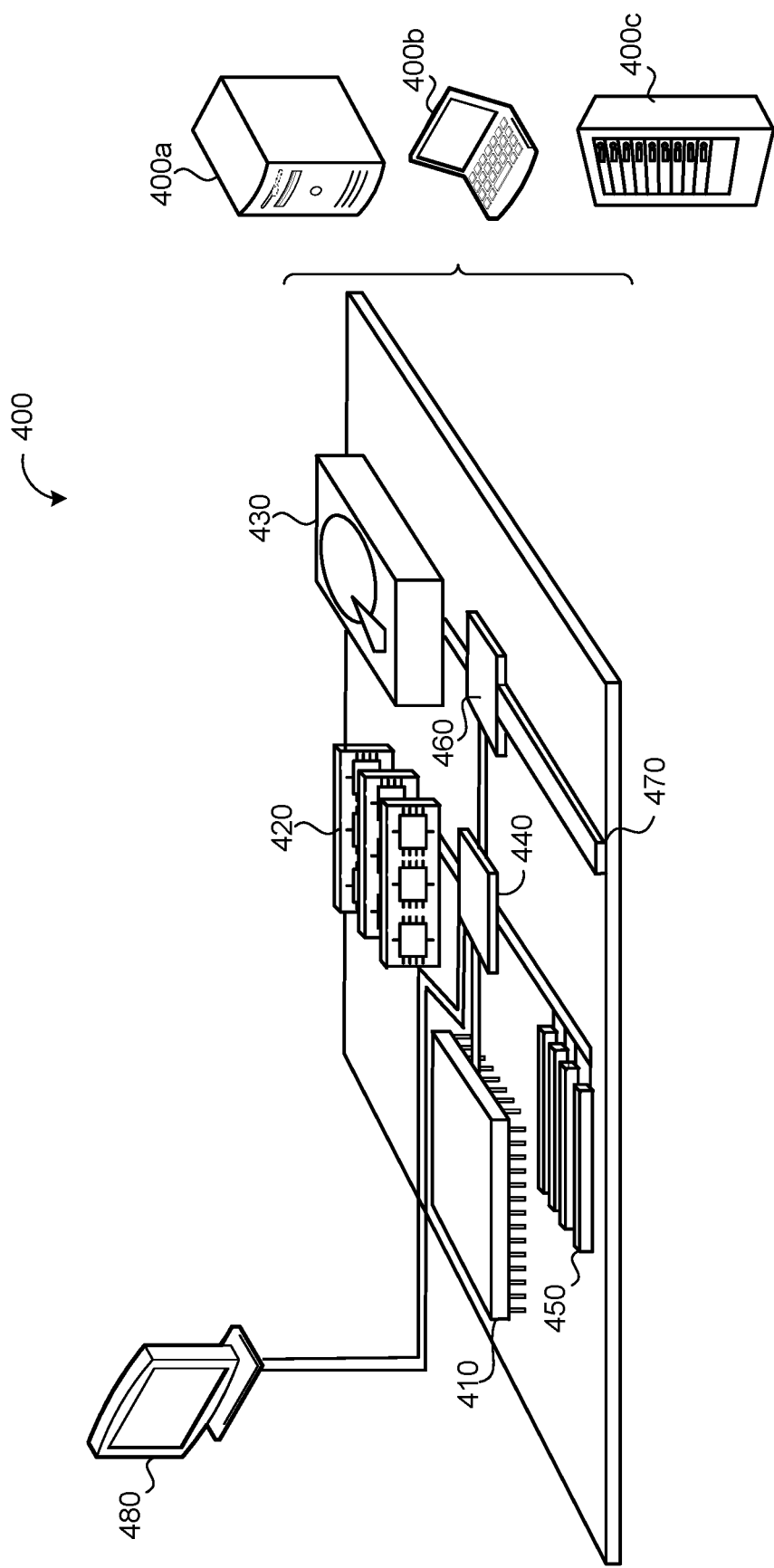
FIG. 4 is a schematic view of an example computing device used to implement the systems and methods of migrating virtual network functions.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 (e.g., data processing hardware) can process instructions for execution within the computing device 400, including instructions stored in the memory 420 or on the storage device 430 to display graphical information for a graphical user interface (GUI) on an external input/output device, such as display 480 coupled to high speed interface 440. For instance, the middlebox manager 200 may execute on the processor 410 (e.g., data processing hardware). The memory 420 and the storage device 430 may correspond to memory hardware in communication with the data processing hardware (e.g., processor 410). In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    identifying a middlebox receiving network flow between virtual network endpoints in a virtual network layer;
    performing, using the middlebox, stateful network functions in the virtual network layer using the received network flow between the virtual network endpoints;
    communicating with one or more backend virtual machines corresponding to the virtual network endpoints;
    receiving flow statistics corresponding to the network flow of the middlebox;
    identifying, based on the flow statistics, an uncommon type of network flow from the network flow, the uncommon type of network flow comprising outlier flow statistics of the flow statistics;
    identifying one or more connections associated with the uncommon type of network flow;
    migrating the one or more connections associated with the uncommon type of network flow from the middlebox to an end host;
    after migrating the one or more connections associated with the uncommon type of network flow from the middlebox to the end host, determining whether the flow statistics satisfy an offload rule, the offload rule indicating when to migrate the network flow from the middlebox to an end host; and
    when the flow statistics satisfy the offload rule, migrating the network flow from the middlebox to the end host.

2. The method of claim 1, wherein the middlebox comprises at least one of a network address translator (NAT), a load balancer, or a firewall.

3. The method of claim 2, wherein the middlebox is associated with a single network device configured to perform network routing.

4. The method of claim 1, wherein migrating the network flow from the middlebox to the end host comprises initiating an end-host connection table at the end host.

5. The method of claim 1, wherein migrating the network flow from the middlebox to the end host comprises:
    initiating an end-host connection table at the end host;
    identifying a network connection request received at the end host;
    determining that the network connection request corresponds to a new network connection;
    updating the end-host connection table with the new network connection; and
    controlling the network flow for the new network connection at the end host.

6. The method of claim 1, wherein migrating the network flow from the middlebox to the end host comprises:
    initiating an end-host connection table at the end host;
    identifying a network connection request received at the end host;
    determining that the network connection request corresponds to an existing network connection not present in the end-host connection table; and
    communicating the network flow for the existing network connection from the end host to the middlebox.

7. The method of claim 6, wherein migrating the network flow from the middlebox further comprises:
    transferring a middlebox connection table from the middlebox to the end host; and
    when the middlebox connection table is transferred from the middlebox to the end host, ceasing communication between the end host and the middlebox.

8. The method of claim 1, wherein the operations further comprise, after migrating the network flow from the middlebox to the end host:
    determining a reduction in the network flow to the end host during a period of time; and
    migrating the network flow from the end host to the middlebox.

9. The method of claim 1, wherein the middlebox is configured to communicate with the one or more backend virtual machines based on consistent hashing.

10. The method of claim 1, wherein migrating the network flow from the middlebox to the end host further comprises:
    identifying that a first health characteristic of each backend virtual machine of the one or more backend virtual machines communicating with the middlebox indicates a healthy state; and
    determining that a second health characteristic corresponding to the end host matches the healthy state of the first health characteristic.

11. A system comprising:
    data processing hardware; and
    memory hardware in communication with the data processing hardware, the memory hardware storing instruction that when executed on the data processing hardware cause the data processing hardware to perform operations comprising:
        identifying a middlebox receiving network flow between virtual network endpoints in a virtual network layer;
        performing, using the middlebox, stateful network functions in the virtual network layer using the received network flow between the virtual network endpoints, and communicating with one or more backend virtual machines corresponding to the virtual network endpoints;
        receiving flow statistics corresponding to the network flow of the middlebox;
        identifying, based on the flow statistics, an uncommon type of network flow from the network flow, the uncommon type of network flow comprising outlier flow statistics of the flow statistics;

identifying one or more connections associated with the uncommon type of network flow;

migrating the one or more connections associated with the uncommon type of network flow from the middlebox to an end host;

after migrating the one or more connections associated with the uncommon type of network flow from the middlebox to the end host, determining whether the flow statistics satisfy an offload rule, the offload rule indicating when to migrate the network flow from the middlebox to the end host; and when the flow statistics satisfy the offload rule, migrating the network flow from the middlebox to the end host.

12. The system of claim 11, wherein the middlebox comprises at least one of a network address translator (NAT), a load balancer, or a firewall.

13. The system of claim 12, wherein the middlebox is associated with a single network device configured to perform network routing.

14. The system of claim 11, wherein migrating the network flow from the middlebox to the end host comprises initiating an end-host connection table at the end host.

15. The system of claim 11, wherein migrating the network flow from the middlebox to the end host comprises:

initiating an end-host connection table at the end host;

identifying a network connection request received at the end host;

determining that the network connection request corresponds to a new network connection;

updating the end-host connection table with the new network connection; and controlling the network flow for the new network connection at the end host.

16. The system of claim 11, wherein migrating the network flow from the middlebox to the end host comprises:

initiating an end-host connection table at the end host;

identifying a network connection request received at the end host;

determining that the network connection request corresponds to an existing network connection not present in the end-host connection table; and communicating the network flow for the existing network connection from the end host to the middlebox.

17. The system of claim 16, wherein migrating the network flow from the middlebox further comprises:

transferring a middlebox connection table from the middlebox to the end host; and when the middlebox connection table is transferred from the middlebox to the end host, ceasing communication between the end host and the middlebox.

18. The system of claim 11, wherein the operations further comprise, after migrating the network flow from the middlebox to the end host:

determining, a reduction in the network flow to the end host during a period of time; and migrating the network flow from the end host to the middlebox.

19. The system of claim 11, wherein the middlebox is configured to communicate with the one or more backend virtual machines based on consistent hashing.

20. The system of claim 11, wherein migrating the network flow from the middlebox to the end host further comprises:

identifying that a first health characteristic of each backend virtual machine of the one or more backend virtual machines communicating with the middlebox indicates a healthy state; and determining that a second health characteristic corresponding to the end host matches the healthy state of the first health characteristic.

* * * * *